July 30, 1957          A. D. ALLMAN          2,800,738

RETRIEVER FOR A FISH LURE

Filed Jan. 4, 1956

INVENTOR
ARVEL D. ALLMAN
BY
*Marvin B. Davis*
ATTORNEY

United States Patent Office 2,800,738
Patented July 30, 1957

2,800,738

RETRIEVER FOR A FISH LURE

Arvel D. Allman, Kansas City, Mo., assignor of thirty-three and one-third percent to Orville L. Fanning and thirty-three and one-third percent to Harry D. Allman, both of Kansas City, Mo.

Application January 4, 1956, Serial No. 557,363

2 Claims. (Cl. 43—17.2)

This invention relates to a retriever for a fish lure and more particularly to a stiff loop or latch member that is sufficiently inclined and shaped to encompass a bulged member or swivel member, used in the connections between the fish line and the fish lure, when the stiff loop member is moving toward the lure, and anchor on the bulged member or swivel member when being pulled by a separate control line in a direction from the fish lure.

Heretofore retrievers of fish hooks and lures have been made by weights to follow the fish line to approach the hooks or fish lures from the front or line end and depended upon the weights to force the hooks backward from the objects on which the hooks were snared. Such retrievers are sometimes successful, but some hooks cannot be removed by such a method.

The broad object of the present invention is to provide a stiff loop or latch member that is of sufficient size and shape to follow a fishing line, encompass a bulged member or swivel member connected between a fish lure and the fish line when approaching the fish lure, and latch to or become anchored on the bulged member or swivel member when pulled, by a heavy line connected thereto, in a reverse direction whereby the hook of the fish lure caught on an object below the water surface may be forcefully pulled loose, bent, or broken to recover the more expensive fish lure and fish line intact.

In the accompanying drawing:

Figure 1 is a view in elevation illustrating my improved retriever latched to a bulged member connected to a fish lure by a safety pin. One hook of the fish lure is illustrated bent and partially pulled from a section of a log by a heavy line attached to the fish lure. The stiff loop or latch member is also shown in dash lines in a raised position and about to encompass the bulged member.

Figure 1:
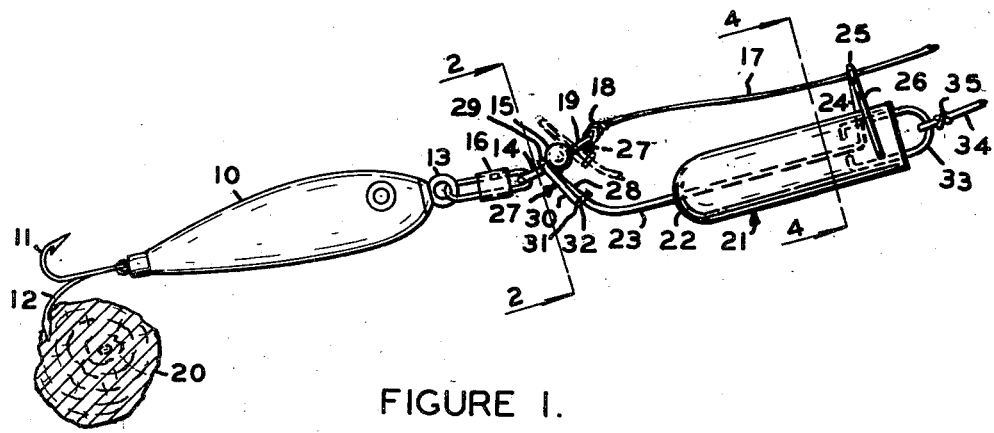
Figure 2:
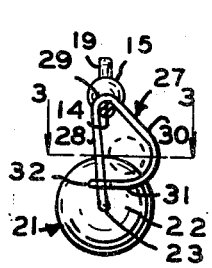
Figure 2 is an enlarged view taken in section on broken lines 2—2 of Figure 1 illustrating only; the stiff loop member, weight, and the bulged member. The bulged member is also shown by dash lines to indicate the relative position to be encompassed by the stiff loop member.
Figure 3:
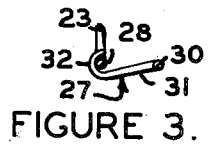
Figure 3 is a view taken in section on broken lines 3—3 of Figure 2 illustrating the closure end portion of the stiff loop member.

The fish lure 10 is one of many species that may be purchased with one or more hooks 11 and 12. The forward end of the fish lure is usually provided with an eye member 13. The eye member 13 is usually coupled to an eye 14 of a swivel member or bulged member 15 with a safety pin 16, and a fishing line 17 is tied at 18 to the eye 19, all of which are old and well known in the precedent art. The fish hooks are usually of small section and are easily bent by a forceful pull thereon when anchored to or caught on an object or log 20. The fishing line sometimes breaks with an unusual pull and if broken all is lost. A weight or bulged member may be substituted for the swivel member if desired.

The weight 21 is illustrated as preferably having a round section, elongated, and with hemispherical shaped end 22.

An intermediate straight length portion 23 preferably of stiff wire has a portion 24 relatively turned uprightly with a reverse curve portion 25, and end portion 26 extended downwardly and against the side of the weight 21.

A loop member 27 is formed in the opposite end portion of the stiff wire by being relatively bent and inclined upwardly and outwardly from the length portion 23. The loop member 27 is formed by the stiff wire portion 28 being inclined upwardly and outwardly, a small reverse bend 29, a portion 30 sloping downwardly and away from the portion 28, the lower portion 31 being bent and extended to portion 28 and terminated with a hook portion 32 latched against portion 28.

A D type of ring 33 is preferably anchored in the weight 21 and has a line 34 fastened at 35 that is much stronger than the fishing line 17 and broadly this construction constitutes a means associated with lowering and raising the weight 21.

The preferred form is illustrated with the weight 21 cast around the stiff wire portion 23.

Figure 4:
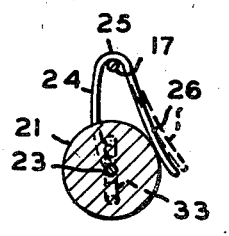
Figure 4 is an enlarged view taken in section on broken lines 4—4 of Figure 1, illustrating the weight with the member or means for spacing it from the fishing line and for sliding thereon.
Figure 5:
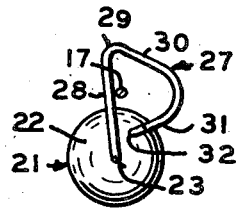
Figure 5 is a view similar to Figure 2 illustrating the stiff loop member opened for receiving the fishing line.
Figure 6:
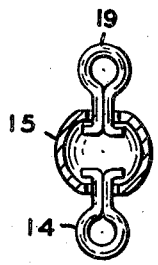
Figure 6 is an enlarged view in elevation of a swivel member with the shell portion thereof broken away to illustrate the interior thereof.
Figure 7:
Figure 7 is a plan view of Figure 6.

It is apparent from the foregoing description that when a fish hook attached to a fish lure towed by a swivel member and fishing line is snagged on an object below the water surface, the stiff loop 27 and the means 24, 25, and 26 will permit a desired portion of the fishing line to be inserted therein through entry hook 32 opened as illustrated in Figure 5 and the springing of wire 26 from the weight 21 illustrated in Figure 4.

The weight 21 is lowered by means of the strong line 34 until the stiff loop 27 encompasses the bulged weight or swivel member 15 and latches on the far side thereof. The strong line 34 is then forcefully pulled with the stiff loop 27 latched on the bulged or swivel member 15 until the fish lure pulls free with or without the snagged hook thus retrieving at least the fish lure and the fishing line intact.

What I claim as new and desire to secure by Letters Patent, is:

1. A retriever for a fish lure having a hook caught on an object below the surface of the water and a bulged member spaced above the fish lure on a fishing line; the retriever comprising: a stiff closed loop so as to encompass and be confined on the fishing line, said stiff closed loop being formed with a sufficiently small bend at the top portion thereof so as to latch against the bulged member, the stiff closed loop having a sufficiently large bend at the lower portion thereof so as to encompass the bulged member, a weight, said stiff closed loop being secured to and inclined forwardly and upwardly from one end of said weight so as to encompass the bulged member when moving forwardly on the fishing line and latch on the bulged member when being pulled rearwardly on the fishing line, means spacing the opposite end of the weight from the fishing line, and a second means adapted to raise and lower said weight.

2. A retriever for a snagged fish lure connected below a bulged member on a fishing line; the retriever comprising: a normally closed stiff loop so as to encompass the fishing line, the top portion of said normally closed stiff loop being of sufficient size so as to latch against the bulged member, the lower portion of said normally closed stiff loop being gradually enlarged so as to encompass the bulged member, a weight portion, and means to space one end of said weight from the fishing line, said normally closed stiff loop being extended from the opposite end of said weight, said normally closed stiff loop being inclined toward the fishing line and away from the weight so as to slide on the bulged member and encompass it when being lowered by a line toward the fish lure, and latch on the bulged member when being moved in the opposite direction to retrieve the fish lure and fishing line.

References Cited in the file of this patent

UNITED STATES PATENTS

| | | |
|---|---|---|
| 2,562,413 | Carr | July 31, 1951 |
| 2,609,632 | Davis | Sept. 9, 1952 |